(12) United States Patent
Nammi

(10) Patent No.: US 10,461,896 B2
(45) Date of Patent: Oct. 29, 2019

(54) CONFIGURATION OF REPETITION FACTORS FOR TRANSMITTING FEEDBACK DATA FOR 5G OR OTHER NEXT GENERATION NETWORK

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 48 days.

(21) Appl. No.: 15/699,650

(22) Filed: Sep. 8, 2017

(65) Prior Publication Data

US 2019/0081739 A1   Mar. 14, 2019

(51) Int. Cl.
| | |
|---|---|
| *H04L 1/18* | (2006.01) |
| *H04W 4/70* | (2018.01) |
| *H04W 72/08* | (2009.01) |
| *H04B 7/022* | (2017.01) |
| *H04B 7/06* | (2006.01) |
| *H04L 1/08* | (2006.01) |
| *H04L 1/20* | (2006.01) |

(Continued)

(52) U.S. Cl.
CPC ......... *H04L 1/1812* (2013.01); *H04B 7/0626* (2013.01); *H04B 7/0632* (2013.01); *H04L 1/08* (2013.01); *H04L 1/1825* (2013.01); *H04L 1/1858* (2013.01); *H04L 1/20* (2013.01); *H04L 41/08* (2013.01); *H04L 1/0026* (2013.01); *H04L 1/0027* (2013.01); *H04W 4/02* (2013.01)

(58) Field of Classification Search
CPC ......... H04L 1/1812; H04L 41/08; H04L 1/20; H04L 1/08; H04B 7/0632; H04B 7/0626; H04W 4/02
See application file for complete search history.

(56) References Cited

U.S. PATENT DOCUMENTS

| | | | |
|---|---|---|---|
| 7,443,830 | B2 | 10/2008 | Engels et al. |
| 7,990,841 | B2 | 8/2011 | Walton et al. |

(Continued)

FOREIGN PATENT DOCUMENTS

| | | |
|---|---|---|
| AU | 2003287291 A1 | 5/2004 |
| AU | 2015204364 A1 | 8/2015 |

(Continued)

OTHER PUBLICATIONS

Hara et al., "Feasibility of OFDMA/TDD/MIMO System with Spatial Scheduling," 2008, 5 pages. http://www.fr.mitsubishielectric-rce.eu/images/fck_upload/Oshima_VTC07.pdf.

(Continued)

*Primary Examiner* — Kiet Tang
(74) *Attorney, Agent, or Firm* — Amin, Turocy & Watson, LLP

(57) ABSTRACT

Configuring channel state information configuration parameters can reduce user equipment uplink feedback information. The user equipment can send the uplink feedback information to the network node by adapting the repetition factor based on one or more criteria. The repetition factor can be determined by the user equipment and/or a network node associated with the user equipment. Thus, reducing the frequency of reporting uplink feedback information can reduce power usage, signal interference, and increase battery life.

20 Claims, 12 Drawing Sheets

(51) Int. Cl.
*H04L 12/24* (2006.01)
*H04W 4/02* (2018.01)
*H04L 1/00* (2006.01)

(56) References Cited

U.S. PATENT DOCUMENTS

| | | | |
|---|---|---|---|
| 8,199,778 | B2 | 6/2012 | Shimomura et al. |
| 9,451,639 | B2 | 9/2016 | Li et al. |
| 9,661,663 | B1 | 5/2017 | Lin et al. |
| 9,693,385 | B2 | 6/2017 | Erceg et al. |
| 9,763,251 | B2 | 9/2017 | Papasakellariou et al. |
| 2006/0133402 | A1 | 6/2006 | Dottling et al. |
| 2008/0095109 | A1 | 4/2008 | Malladi et al. |
| 2014/0036799 | A1* | 2/2014 | Bharadwaj .......... H04W 72/085 370/329 |
| 2014/0098761 | A1 | 4/2014 | Lee et al. |
| 2015/0085717 | A1 | 3/2015 | Papasakellariou et al. |
| 2016/0007228 | A1* | 1/2016 | Soriaga ............. H04W 28/0257 370/216 |
| 2016/0066155 | A1* | 3/2016 | Fan ....................... G06F 3/0484 455/457 |
| 2016/0142189 | A1 | 5/2016 | Shin et al. |
| 2016/0226649 | A1 | 8/2016 | Papasakellariou et al. |
| 2016/0269160 | A1 | 9/2016 | Noh et al. |
| 2016/0285535 | A1 | 9/2016 | Kim et al. |
| 2016/0353440 | A1* | 12/2016 | Lee ........................ H04W 4/70 |
| 2016/0365944 | A1 | 12/2016 | Blankenship et al. |
| 2017/0163396 | A1 | 6/2017 | Blankenship |
| 2017/0257884 | A1 | 9/2017 | Rahman et al. |
| 2017/0288808 | A1 | 10/2017 | Blankenship et al. |
| 2017/0295005 | A1 | 10/2017 | Lee et al. |
| 2017/0353224 | A1* | 12/2017 | Wang ..................... H04B 7/022 |
| 2018/0206277 | A1* | 7/2018 | Krenz ................... H04W 24/02 |

FOREIGN PATENT DOCUMENTS

| | | |
|---|---|---|
| WO | 2015113214 A1 | 8/2015 |
| WO | 2016089269 A1 | 6/2016 |

OTHER PUBLICATIONS

Abu-Ali et al., "Uplink Scheduling in LTE and LTE-Advanced: Tutorial, Survey and Evaluation Framework," IEEE Communications Surveys & Tutorials, 2014, vol. 16, No. 3, pp. 1239-1265, IEEE, 27 pages.

Murata et al., "Radio Access Technologies for Fifth Generation Mobile Communications System: Review of Recent Research and Developments in Japan," IEICE Transactions on Communications, Aug. 2016, vol. E99-B, No. 8, pp. 1638-1647, The Institute of Electronics, Information and Communication Engineers, 10 pages.

Saito et al., "Non-Orthogonal Multiple Access (NOMA) for Future Radio Access," IEEE 77th Vehicular Technology Conference, 2013, IEEE, 5 pages.

Love et al., "An Overview of Limited Feedback in Wireless Communication Systems," IEEE Journal on Selected Areas in Communications, Oct. 2008, vol. 26, No. 8, pp. 1341-1365, IEEE, 25 pages.

International Search Report and Written Opinion received for International Application No. PCT/US2018/050098 dated Dec. 20, 2018, 13 pages.

* cited by examiner

CONFIGURATION OF REPETITION FACTORS FOR TRANSMITTING FEEDBACK DATA FOR 5G OR OTHER NEXT GENERATION NETWORK

TECHNICAL FIELD

This disclosure relates generally to facilitating configuration of repetition factors for a wireless network. For example, this disclosure relates to facilitating transmitting feedback data for a 5G, or other next generation network, in accordance with a repetition factor.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a repetition factors is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
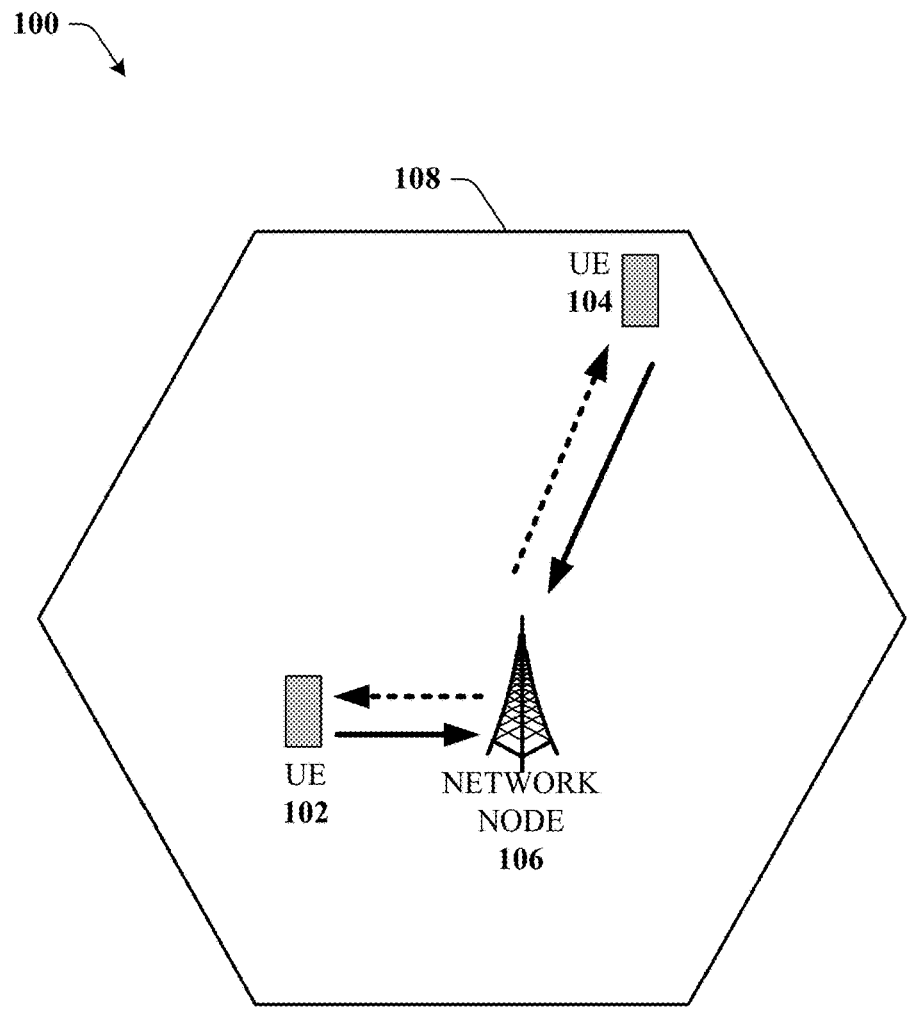
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate transmitting feedback data in accordance with a repetition factor for a 5G or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate transmitting feedback data in accordance with a repetition factor for a 5G or other next generation networks. Facilitating transmitting feedback data in accordance with a repetition factor can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A channel quality indicator (CQI) is a key indicator for 5G downlink (DL) channel quality and can be used to determine DL scheduling. The CQI can be signaled from the UE to the gNode B on one or several uplink physical uplink control channels (PUCCH), together with other channel state information (CSI), depending on a configured downlink antenna transmission mode. Examples of other types of CSI include rank information or rank indicator (RI) and precoding matrix indicator (PCI), etc. However, the PUCCH transmissions from several UEs can increase an uplink interference level, or more specifically, rise over thermal (RoT) received in uplink at the gNode B. Consequently, during an uplink, all users can transmit on the same resources and users are separated by non-orthogonal scrambling codes called cazac sequences. Therefore uplink NR transmissions share interference limited radio resources. Therefore, the interference in uplink frequencies should be reduced to ensure high or at least desired signal-to-interference ratio (SIR) levels on uplink transmission channels and to maintain a stable system operation. The network nodes can control parameters related to the CSI. The parameters are signaled by the serving network to the UE via radio resource control (RRC) signaling (higher layer). The parameters can comprise: a CQI feedback cycle, a CQI repetition factor, and/or a hybrid automatic repeat request acknowledgment factor, etc.

The CQI feedback cycle parameter describes how frequently and with which periodicity the UE shall transmit a new CQI report. This parameter is configurable via an RRC protocol and the supported values are {0, 2, 4, 8, 10, 20, 40, 80, 160} ms, for example. The signaled value 0ms can be used to indicate that the UE should not transmit any CQI report. The CQI repetition factor (e.g., N_cqi_transmit) describes the number of times a certain CQI report should be transmitted. The CQI information can be repeated a total of N_cqi_transmit-1 times and the set of values that can be configured at the UE via RRC by the network are {1, 2, 3, and 4}.

The HARQ-ACK repetition factor (e.g., N_acknack_transmit) describes how many times the UE should transmit the (same) HARQ-ACK message associated with a transport block. In other words, the HARQ-ACK transmission can be repeated a total of N_acknack_transmit-1 times. The supported values are {1, 2, 3, and 4} and it is configured by the network via RRC. Thus the UE uplink (UL) feedback reporting (e.g. CSI, HARQ ACK/NACK) can be reduce based on one or more criteria associated with the repetition factor with which the UE sends the uplink feedback information to the network node. The method can be implemented in a network node and/or in a UE.

The method can reduce the frequency of reporting uplink feedback information (e.g. CSI) especially when UE is close to baser station and/or when radio conditions are good. This, in turn, reduces the transmitted power for the uplink control channels, resulting in saved power that can be used for other data traffic or voice channels. Additionally, with less frequent transmission of UL feedback information (e.g., HARQ A/N, CSI, etc.), the interference to the other uplink users is minimized, and the reduction in frequency of UL feedback transmissions saves UE battery life and leads to less processing in the base station.

The UE, a first network node, or a second network node can use one or more criteria for determining one or more repetition factors for use by the UE for transmitting one or more types of the uplink feedback information to the network node(s). The criteria can include, but is not limited to: UE location, reported CSI value(s), UL transmit power, UE battery life, base station (BS) receiver type, BS processing capability, number of UEs simultaneously using a network node, UL interference level, and/or a combination of the aforementioned criteria.

One exemplary criterion for determining the repetition factor is the UE location in a cell. For example, for a UE close to a network node (i.e., second network node e.g., Node B) or for the UE in the cell center the node (e.g. UE or first network node), the first network node can configure the UE with a lower value of the repetition factor. On the other hand, for the UE farther away from the network node, a higher value of repetition factor can be configured by the node to increase the chances that CQI data is received by the second network node. Thus, the UE nearer to the cell center can reduce the transmission of UE feedback information (e.g., reduce CQI reporting), thereby reducing the signaling overhead as well as the uplink interference received at the second network node.

There are several methods that can be used to identify the UE location. For example, the UE and/or base station radio measurement(s) can be used for determining the UE location. Examples of such UE radio measurements can comprise: reference signals received power (RSRP), reference signals received quality (RSRQ), CQI, path loss, signal interference to noise ration (SINR), signal to noise ratio (SNR), block error rate (BLER), etc. The UE radio measurement can also be performed on uplink signals such as UE transmit power and UE power headroom (e.g., the difference between UE maximum power and UE transmit power in log scale). The radio measurement can also be a timing measurement such as one-way propagation delay between the UE and the serving base station, round trip of the signal transmitted between UE and the serving base station, UE Rx-Tx time difference, BS Rx-Tx time difference etc. Most of these measurements can also be reported by the UE to the first network node, which can use the measurements to determine the repetition factor. For example, if CPICH RSCP (in HSPA) measured by the UE is below or above a threshold, then the UE is considered to be close to the base station. In this case, a lower repetition factor (e.g., 1 or 2) can be used. But if CPICH RSCP measured from the serving cell is below a certain threshold, then the UE is considered to be far from the base station. In this case, a larger value can be used for the repetition factor (e.g. 3 or 4) for transmitting one or more types of uplink feedback signals. Several measurements can also be combined to more accurately determine the UE location. For example, if RSCP is above a threshold and the UE transmit power is below a threshold, then the UE can be assumed to be close to the serving base station. Therefore, a smaller value of the repetition factor can be used.

The UE location in the cell can also be directly determined by using one or combinations of positioning methods including, but not limited to: global navigation satellite system (GNSS), assisted GNSS (A-GNSS), observed time difference of arrival (OTDOA), enhanced cell ID (E-CID), etc. Positioning methods such as OTDOA and E-CID, in turn, rely on UE and/or base station radio measurements such as reference signal measurements, timing measurements, angle of arrival of signal measured at the base station, etc.

Another criterion for implicitly determining the proximity of the UE to a serving base station (i.e., second network node) is the size of a neighbor cell list (NCL) and/or a maximum number of neighbor cells identified by the UE. The NCL can be signaled to the UE, by the first network node, for performing radio measurements on one or more neighbor cells. Generally, for UEs close to the serving network node, a smaller NCL is signaled, whereas a larger NCL is signaled to the UEs, which are located on the cell's edge. If the size of NCL and/or number of identified neighbor cells is below a threshold, then it can be concluded that the corresponding UE is close to the second network node. Otherwise the UE may be considered to be located at the cell edge. Any combination of two or more of the radio measurements, determined location based on the positioning methods and NCL, and/or maximum number of identified neighbor cells can be jointly used for more accurately determining the UE location in the cell and the corresponding repetition factor.

The CSI estimate can be based on SINR measured by the UE. If the CSI (e.g., CQI) is larger than a threshold, then it can be concluded that the radio conditions are better and robust. In both frequency-division duplexing (FDD) and time division duplexing (TDD), the path loss can be the same or similar during uplink and downlink. In particular, in a TDD system (e.g., such as LTE TDD), base on channel reciprocity, the fast fading conditions in uplink and downlink are also the same. The repetition factor is semi-statically (e.g., on a slow basis) configured and can therefore be based on path loss. Consequently, in a robust radio condition based on the CSI report (e.g., when the CQI is above a threshold) a lower value of the repetition factor can be used. Otherwise, when a radio condition is less robust, a larger value of the repetition factor can be used. The use of CSI can be similar to the criterion to determine UE location due to the SINR at cell edges being very low. The adjustment of the repetition factor can also be based on statistics of CSI reports collected over a period of time (e.g., T0). For example, the UE is considered to be at the cell edge only if the UE reported CQI remains below a threshold over at least time period T0. Then, a larger repetition factor can be used.

The repetition factor used for transmitting uplink feedback signals can have an impact on the uplink transmit power. For example, if the repletion factor is larger, then the UE has to transmit more power for sending the same type of uplink feedback signal. This is not to be confused with the use of UE transmit power for determining UE location as described previously. If the UE transmit power or expected UE transmit power is above a threshold, then the node may decide to lower a repetition factor below a threshold (e.g., 2 or 1) and vice versa. Similar measurements, such as UE power headroom, which also depict the current or expected UE transmit power can also be used for adjusting the repetition factor.

Another criterion that can be used to determine the repetition factor is the UE battery life or status. Due to increased processing, as well as an increase in transmit power, a larger value of the repetition factor can consume more UE battery life. Therefore if the UE battery life or available UE battery power is below a threshold, then the node may decide to use a lower repetition factor.

If the second network node has an enhanced BS receiver (aka., advanced receiver, interference mitigation receiver, interference cancellation receiver etc.), then the first network node or second network node can decide to use a lower value of the repetition factor for transmitting one or more types of uplink feedback information. However if the second network node has a baseline receiver, then the first network node can decide to use a higher value of the repetition factor. The BS receiver type information (e.g., "0" for a baseline receiver, and "1" for an enhanced receiver) can also be signaled to the UE, thus allowing the UE to autonomously decide the repetition factor based on the received information.

An enhanced BS receiver can decode a received signal even if the signal is weak and/or affected by the interference. The enhanced BS receiver achieves this by mitigating, reducing, and/or cancelling interference caused by signals transmitted by other UEs. Conversely, a baseline receiver is not capable of mitigating interference caused by other UEs (e.g., UEs other than the one whose uplink feedback signal is intended to be received at the BS).

Reception, decoding, and processing of repeated contents of the same type of feedback information at the second network node (i.e. BS) involve more processing and use of memory units than the first network node. For example, the second network node receives all the contents, stores them in memory, processes them by using a certain combining scheme, and uses the final result for identifying the feedback information. The first network node can also access the BS processing capability for deciding the repetition factor. For instance, the first network node can adapt the repetition factor, of at least certain UEs, depending upon the BS processing capability. In case of limited processing capability (e.g., fewer processing and/or memory units) a smaller repetition factor can be configured for at least certain UEs (e.g., UEs close to their serving BS). The first network node can also signal the BS processing capability information (e.g., "0" denoting low and "1" denoting high processing capabilities) to the UE, which can use the received information for autonomously deciding the repetition factor.

The complexity of receiving and processing the uplink feedback information at the second network node increases with the number of UEs that simultaneously send UL feedback information. The complexity further increases if a larger repetition factor is used for several UEs. The first network node can adapt the repetition factor of all or some UEs depending upon the number of UEs configured to simultaneously send UL feedback information in a cell. For example, the first network node can decide to lower the repetition factor of at least certain UEs in case the total number of UEs configured to send UL feedback information simultaneously is above a threshold. The first network node can lower the repetition of those UEs that are close to the serving BS (i.e., the second network node). The first network node can also signal a threshold value in terms of the total number of simultaneous UEs in a cell. The UE or UE's receiving the threshold value can take into account the received threshold for autonomously adapting the repetition factor for use by the UE for transmitting one or more types of UL feedback information to the second network node.

The transmission of UL feedback information with a larger number of repetitions can increase uplink interference, which can degrade the quality of the received signal at the second network node. Consequently, the first network node can adapt the repetition factor of one or more UEs depending upon the uplink interference. For example, if the UL interference experienced at the second network node is above a threshold (e.g., above −90 dBm/180 KHz in LTE) then the first network node can use a smaller repetition factor (e.g., 1 or 2) for transmission of UL feedback information by the UE. In the aforementioned case, the first network node can also lower the repetition factor of UEs, which are close to their serving base station. The first network node can also signal a threshold (in terms of uplink received interference) to at least certain UEs. The UE receiving the threshold can take into account the threshold for autonomously adapting the repetition factor to be used by the said UE for transmitting one or more types of UL feedback information to the second network node.

Any combination of the aforementioned criteria can be used by the node and/or the UE for determining the repetition factor for transmission of uplink feedback information to the second network node. Also the same or different combination of criteria can be used for the same UE for transmitting different types of UL feedback information. For example, if a UE is on the cell edge, but the UE battery is low and/or uplink interference is above a threshold, then the node can use a smaller repetition factor e.g. 1 or 2. At low SNR, the performance between the two algorithms is same. Hence, if the receiver computes the long term SNR, and checks if it is less than a pre-defined threshold, then it can choose beam selection based on RSRP (two stage approach), thereby reducing the number of computations required for beam selection. The UE can periodically compute the long term SNR, and decide whether to choose beam selection based on the RSRP or joint selection of beam index, RI, PMI and CQI (single stage approach). Once the network node determines the parameters related to CSI, it can convey this information to the UE using RRC or higher layer signaling. In another embodiment, the network can convey this information as part of downlink control channel.

In one embodiment, described herein is a method comprising determining channel quality data to be sent to a network device of a wireless network. Based on repetition data associated with a repetition factor applicable to a repetition of sending the channel quality data to the network device, the method can comprise determining the repetition factor for transmission of feedback data associated with an uplink transmission to the network device via the channel, wherein the repetition factor transmitted to the network device is associated with hybrid automatic repeat request data different from the channel quality data. Furthermore, in response to the determining the repetition factor, the method can comprise transmitting the repetition factor to the network device.

According to another embodiment, a system can facilitate, configuring a mobile device to transmit uplink feedback data, associated with an uplink feedback of an uplink control channel of a network device of a wireless network, to a second network device of the wireless network. Based on a criterion associated with a repetition value, the system can facilitate determining the repetition value to be used by the mobile device to repeat a transmission of the uplink feedback data to the second network device, wherein the repetition value transmitted to the second network device is associated with hybrid automatic repeat request data different from channel quality data. Additionally, in response to the determining the repetition value, the system can transmit the repetition value to the mobile device to transmit the uplink feedback data in accordance with the repetition value.

According to yet another embodiment, described herein is a machine-readable storage medium that can perform the operations comprising determining channel quality data to be sent to a network device of a wireless network. Based on criterion data representative of a criterion associated with a repetition factor for use with transmitting feedback data via an uplink transmission to the network device, the machine-readable storage medium can generate the repetition factor, wherein the repetition factor is associated with hybrid automatic repeat request data. Furthermore, in response to the generating the repetition factor, the machine-readable storage medium can facilitate a transmission in accordance with the repetition factor.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, he wireless communication system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
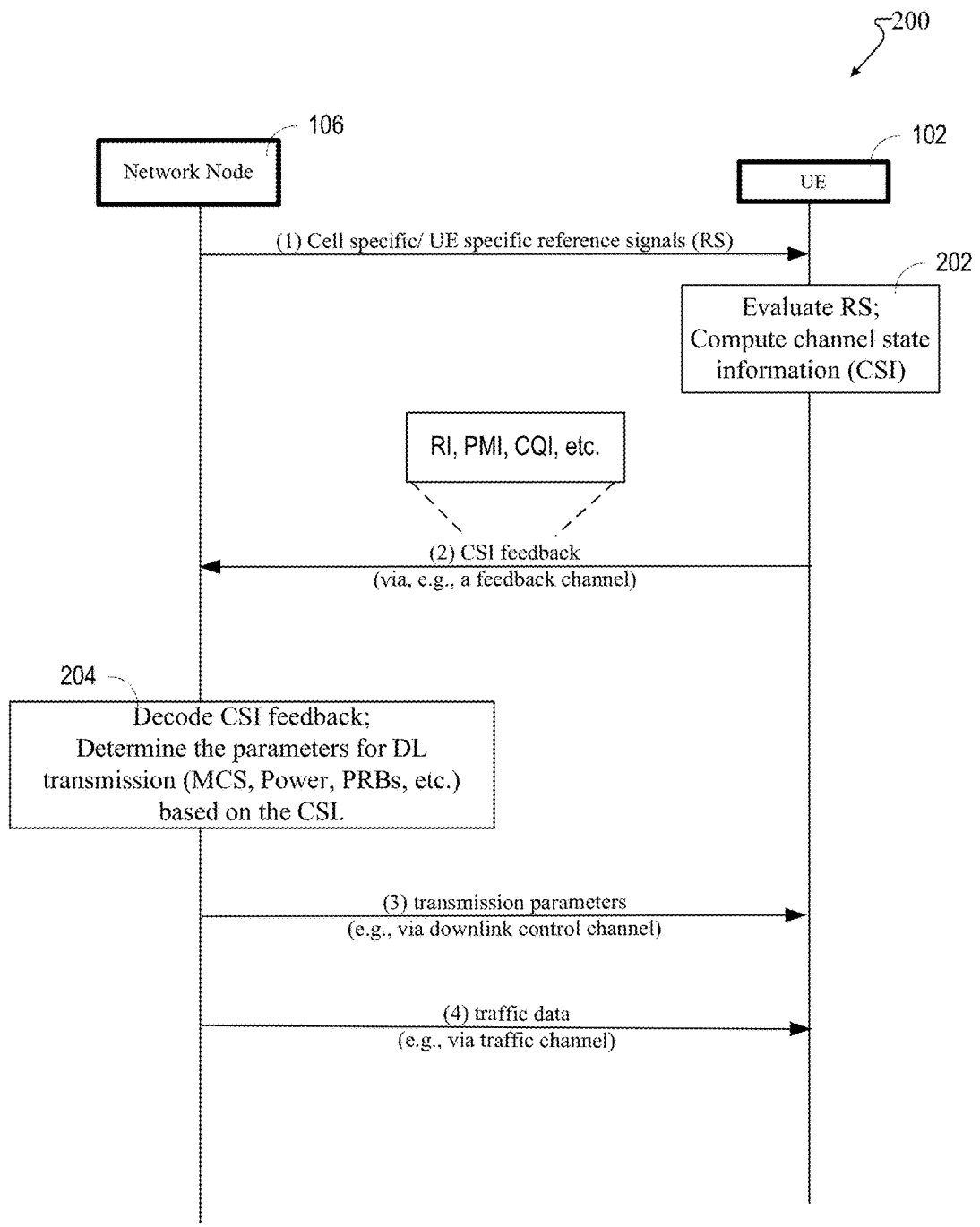
FIG. 2 illustrates an example schematic system block diagram of a UE in communication with a node device.

Referring now to FIG. 2, illustrated is an example schematic system block diagram of a UE in communication with a node device via a system 200. The system 200 comprises a network node (e.g., network node 106), can transmit a reference signal (RS) at transaction (1), which can be beam formed or non-beam formed, to a user equipment (e.g., UE 102). FIG. 2 illustrates a closed loop transaction diagram (e.g., sequence chart). Briefly described, in this technique, a reference signal is first sent from the network node to the UE. From the reference signals, the UE can compute the channel estimates and the parameters needed for channel state information (CSI) reporting. In LTE, the CSI report can comprise a channel quality indicator (CQI), preceding matrix index (PMI), rank information (RI), etc. The CSI report is sent to the network node via a feedback channel either on a periodic basis or on demand based CSI (e.g., aperiodic CSI reporting). The network node scheduler can use this information to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending on which value a UE reports, the node can transmit data with different transport block sizes. If the node receives a high CQI value from the UE, then it can transmit data with larger transport block size, and vice versa.

[Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 106 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 106, as shown in block 204 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 104 can use the decoded CSI feedback to determine a suitable transmission protocol, which can comprise modulation and coding schemes (MCS) applicable to modulation and coding of the different transmissions between the network node 106 and the UE 102, power, physical resource blocks (PRBs), etc.

The network node 106 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network node 106 to the UE 102.

Figure 3:
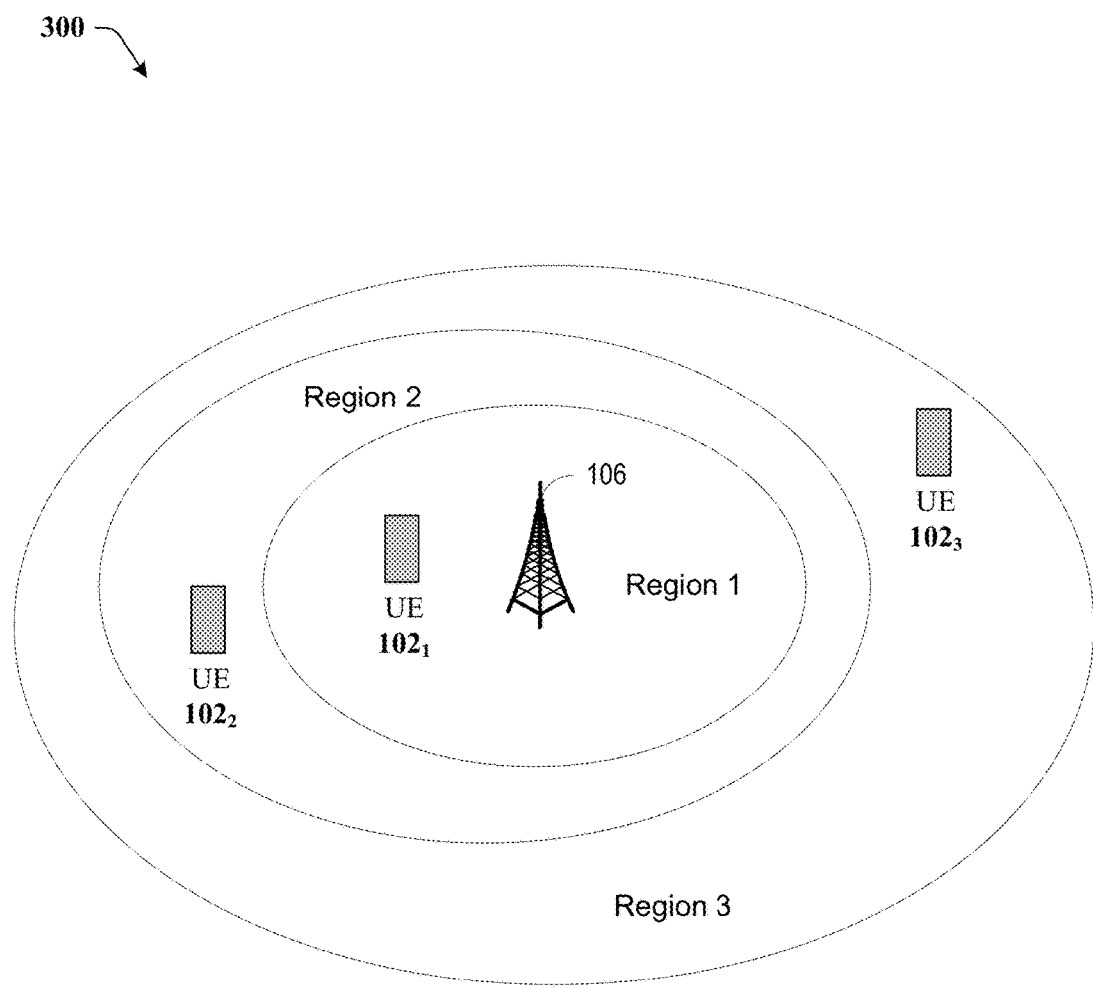
FIG. 3 illustrates an example schematic system block diagram of a of variable repetition factor depending on a UE location within a cell.

Referring now to FIG. 3, illustrated is an example schematic system block diagram of a of variable repetition factor depending on a UE location within a cell. A system 300 can comprise a UE 102, wherein the UE's 102 location within a cell can be used to determine the repetition factor. As shown in FIG. 3, for the UE $102_1$ in the region 1, the network node 106 can be configured with repetition factor 1 based on an indication that the UE $102_1$ is within a certain distance from the network node 106. Likewise, the UE $102_2$ in region 2 can be configured with repetition factor 2 based on an indication that the UE $102_2$ is within a certain distance from the network node 106. Thus, the UE $102_3$ in region 3 can be configured with repetition factor 4 based on an indication that the UE $102_3$ is within a certain distance from the network node 106. It should be noted that in alternative embodiments, the cell can be divided into any number of regions.

Figure 4:
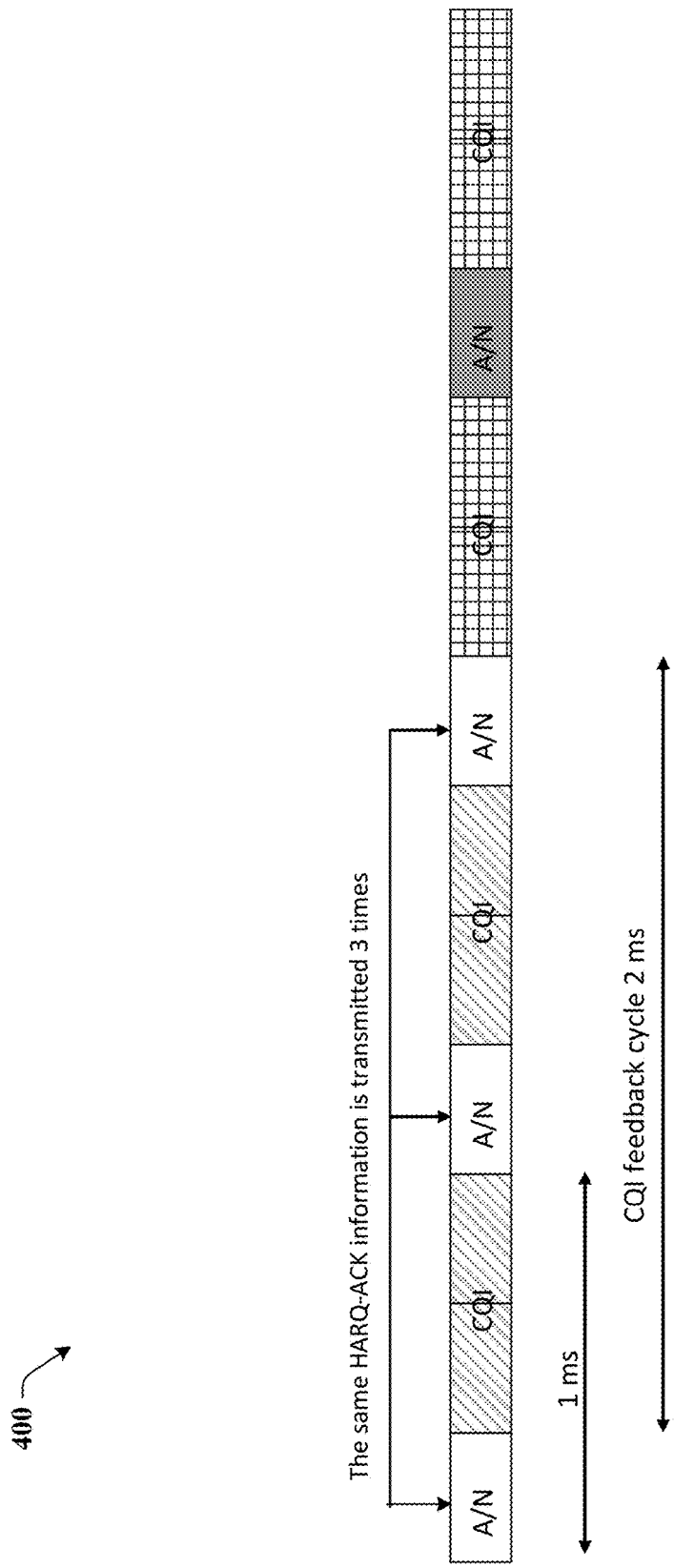
FIG. 4 illustrates an example schematic system block diagram of a minimum CQI feedback cycle, CQI repetition factor, and HARQ-ACK repetition factor for physical uplink control channel transmissions.

Referring now to FIG. 4, illustrated is an example schematic system block diagram of a minimum CQI feedback cycle, CQI repetition factor, and HARQ-ACK repetition factor for physical uplink control channel transmissions. FIG. 4 illustrates the CQI feedback cycle is 2 ms, the CQI repetition factor is 2, and the HARQ-ACK repetition factor is 3.

Figure 5:
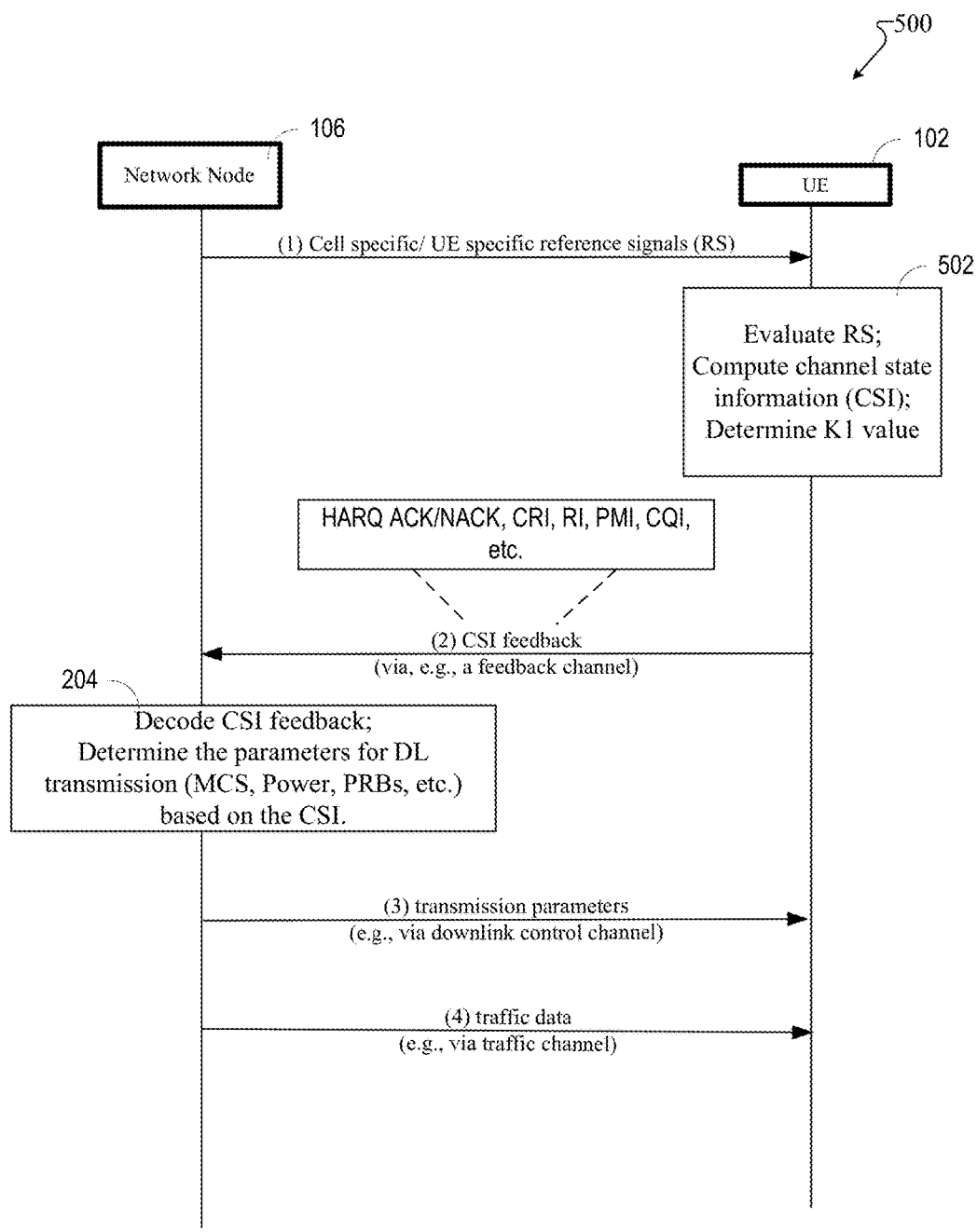
FIG. 5 illustrates an example schematic system block diagram of a UE in communication with a node device for determining a repetition factor by the UE.

Referring now to FIG. 5 illustrates an example schematic system block diagram of a UE in communication with a node device for determining a repetition factor by the UE. A UE 102 can be served by a first cell, which is served by a first network node 106. The UE 102 can be configured by the first network node 106 to obtain or determine an estimate of a first type of uplink feedback information. Examples of UL feedback information are CQI, HARQ ACK/NACK, PMI, RI, CRI etc. The UE 102 can also be configured to obtain and transmit second uplink feedback information to the second network node 602. The UE 102 can also be configured to obtain and transmit plural types of uplink feedback information to a second network node. The UE 102 can autonomously determine or can further be configured by the first network node 106 with at least a first repetition factor (K1) (e.g., determine K1 value 502) based on one or more criteria. The value of K1 can be used by the UE 102 for repeating the same content of at least the first type of uplink feedback information and transmitting the repeated content to the second network node.

Repetition of the same uplink feedback signal can enhance the reliability of the reception of the feedback at the second network node. The terms "repetition factor" (aka., a redundancy factor, redundancy version) can be associated with the terms "repeated content" (aka., redundancy content). The transmission of the repeated contents can be sent in the same message, transmission occasion, instance, or over multiple messages, channel transmission occasions, or instances. In some embodiments the same value of K1 can be used for transmitting the repeated contents of a plurality of uplink feedback information (e.g., same for transmitting CQI, HARQ ACK/NACK, etc.). However, in some embodiments, different values of K1 can be used for transmitting the repeated contents of different types of uplink feedback information (e.g., K1=2 and K1=4 for transmitting CQI, and HARQ ACK/NACK, respectively).

In an alternate embodiment, the UE 102 can autonomously determine the repetition factor (K1) based on any one or combination of criteria described above. The UE 102 can autonomously determine the value of K1 according to a pre-defined rule and/or based on explicit indication received from the first network node 106. For example, a pre-defined rule can pre-define one or more criteria to be used by the UE 102 for determining K1. The UE 102 can also receive information about which of the pre-defined criteria are to be used by the UE 102 for determining K1. The UE 102 can also be configured by the first network node 106 with an explicit indication that the UE 102 is allowed to autonomously determine K1 and use K1 for one or more purposes. The UE 102 can also be configured by the first network node 106 with the type(s) of UL feedback information for which the UE 102 is required to autonomously determine the value of K1. The UE 102 can also use a parameter related to time period ($T_0$) over which the UE 102 should evaluate one or more criteria in order to determine the value of K1. The parameter $T_0$ can also be pre-defined or configured by the first network node 106.

Consequently, the UE 102 can use the determined value of K1 for one or more of the following objectives: 1) for transmitting one or more types of UL feedback information (e.g. for CQI reporting and/or for HARQ ACK/NACK); 2) for sending the determined value of K1 to the first network node 106; 3) for comparing the value of K1 with at least one threshold K2. The UE 102 can further compare K1 with two thresholds K2 and K3. The threshold K2 and K3 can be pre-defined or configured by the first network node 106. Based on the comparison of K1 with K2 or with K2 and K3, the UE 102 can initiate additional actions. Such actions can be based on pre-defined rules or configured by the first network node. Examples of such actions are: 1) the UE uses K1 for any of the above objectives (#1 and/or 2) only if K1<K2; 2) the UE uses K1 for any of the above objectives (1 and/or 2) only if K1≥K2; and/or 3) the UE uses K1 for any of the above objectives (#1 and/or 2) only if K2≤K1≤K3.

Figure 6:
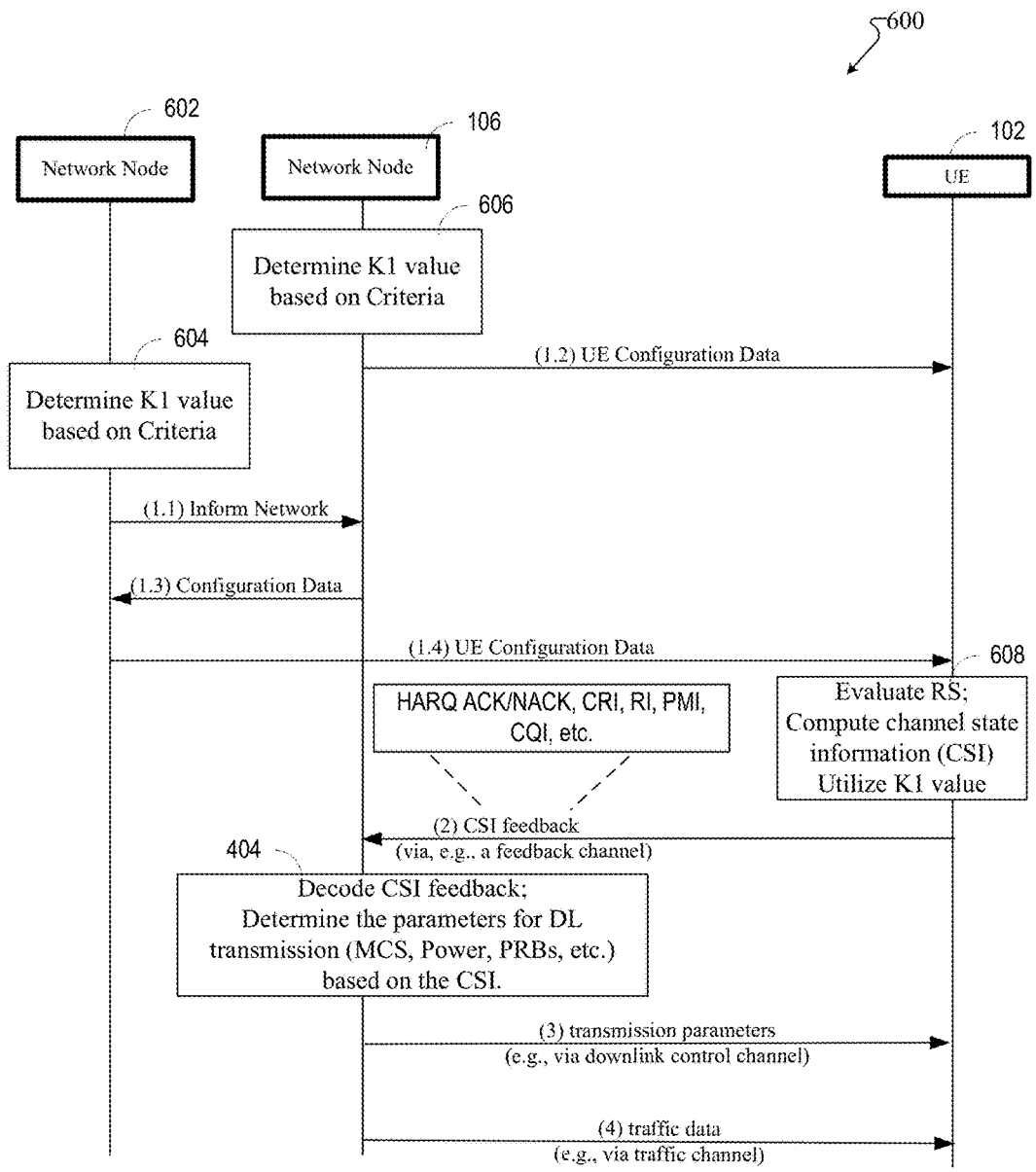
FIG. 6 illustrates an example schematic system block diagram of a UE in communication with a node device for determining a repetition factor by the node device.

Referring now to FIG. 6, illustrates an example schematic system block diagram of a UE in communication with a node device for determining a repetition factor by the node device. In another embodiment, a first network node 106 (or a second network node) can use one or more of the above criteria for determining the repetition factor (K1). The second network node 602 can determine K1 604 and inform the first network node 106 (e.g., transaction 1.1) of the value of K1. The first network node 106 can then configure (e.g., transaction 1.2) the UE 102 with K1 or information associated with K1. In some embodiments the first network node 106 can determine K1 606 and configure the UE 102 (e.g., transaction 1.2) and the second network node 602 (e.g., transaction 1.3) with K1 or with information associated with K1. The second network node 602 can be aware of the value of K1 in order to decode the repeated contents of the UL feedback information. Yet, in some embodiments, the second network node 602 can determine K1 and directly configure the UE 102 (e.g., transaction 1.4) with the determined value of K1 or with information associated with K1. The information associated with K1 can be a pre-defined identifier (ID) of one of the pre-defined values of K1 (e.g., ID#0, 1, 2, 3 corresponding to K1=1, 2, 4 and 8, respectively). The network node (e.g., first or second network node) can also configure the UE 102 with one or more thresholds in terms of the repetition factor (e.g. K2 and K3). The thresholds can be used (e.g., utilized K1 value 608) by the UE 102 for comparing its own determined value K1 and for taking appropriate action(s) as described above.

The network node (i.e. first or second network node) can also evaluate the repetition factor determined and reported by the UE 102. In one exemplary embodiment the network node can only configure the UE with the value of K1, which is determined by the network node itself. In another exemplary embodiment, the network node can use a function or perform an operation for comparing the values of K1 determined by itself and the UE 102 and take an action based on the comparison. For example, assume the UE 102 and network node determined repetition factors are K1' and K1", respectively. The final value K1 can be derived based on a function K1=g(K1', K1"). In another example, the first network node can derive the final value K1 if K1'=K1". Alternatively, K1 can equal min (K1', K1"), max (K1', K1"), mean (K1', K1").

Figure 7:
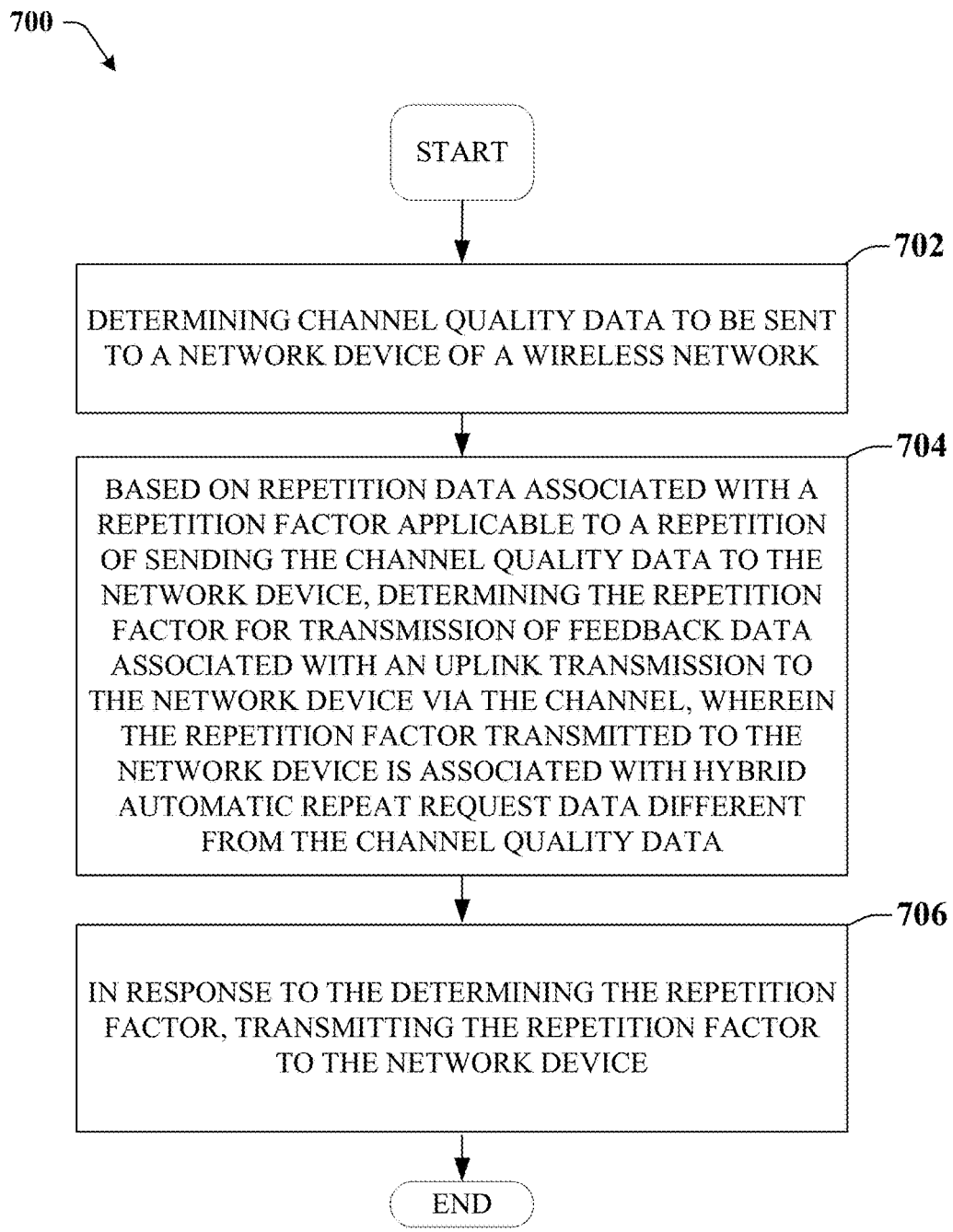
FIG. 7 illustrates an example flow diagram for a mobile device determining a repetition factor according to one or more embodiments.

Referring now to FIG. 7, illustrated is an example flow diagram 700 for a mobile device determining a repetition factor. At element 702, a method can comprise determining channel quality data (via the UE 102) to be sent to a network device (e.g., the network node 106) of a wireless network. Based on repetition data associated with a repetition factor applicable to a repetition of sending the channel quality data to the network device (e.g., the network node 106), the method can determine (via the UE 102) the repetition factor for transmission of feedback data associated with an uplink transmission to the network device (e.g., the network node 106) via the channel, wherein the repetition factor transmitted to the network device (e.g., the network node 106) is associated with hybrid automatic repeat request data different from the channel quality data at element 704. Additionally, and in response to the determining the repetition factor, the method can comprise transmitting (via the UE 102) the repetition factor to the network device (e.g., the network node 106) at element 706.

Figure 8:
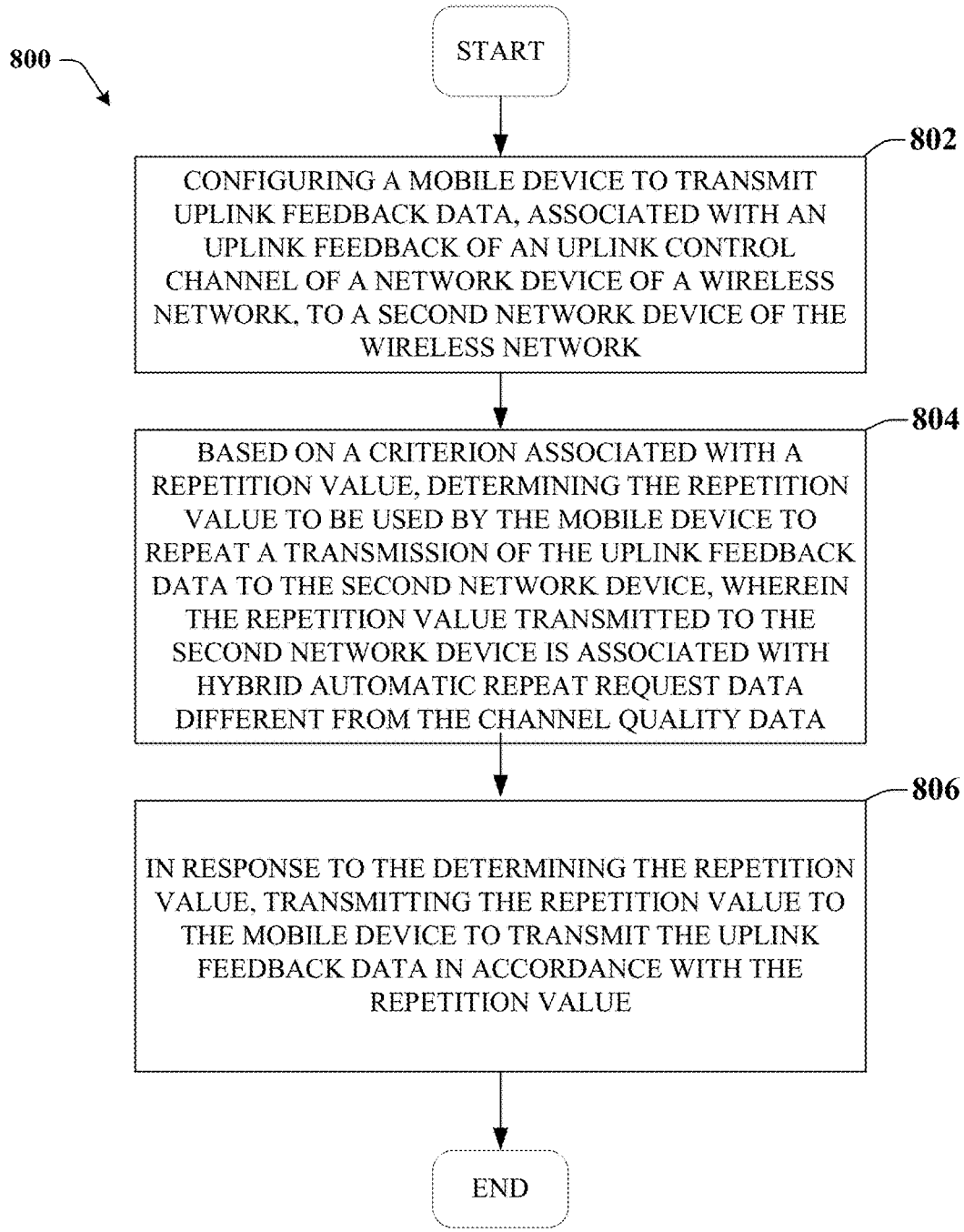
FIG. 8 illustrates an example flow diagram for a node device determining a repetition factor according to one or more embodiments according to one or more embodiments.

Referring now to FIG. 8, illustrated is an example flow diagram 800 for a node device determining a repetition factor. The system can comprise configuring a mobile device (e.g., the UE 102) to transmit uplink feedback data, associated with an uplink feedback of an uplink control channel of a network device (e.g., the network node 106) of a wireless network, to a second network device (e.g., the network node 602) of the wireless network at element 802. Based on a criterion associated with a repetition value, the system can comprise determining the repetition value to be used by the mobile device (e.g., the UE 102) to repeat a transmission of the uplink feedback data to the second network device (e.g., the network node 602), wherein the repetition value transmitted to the second network device (e.g., the network node 602) is associated with hybrid automatic repeat request data different from channel quality data at element 804. Furthermore, in response to the determining the repetition value, the system can facilitate transmitting the repetition value to the mobile device (e.g., the UE 102) to transmit the uplink feedback data in accordance with the repetition value at element 806.

Figure 9:
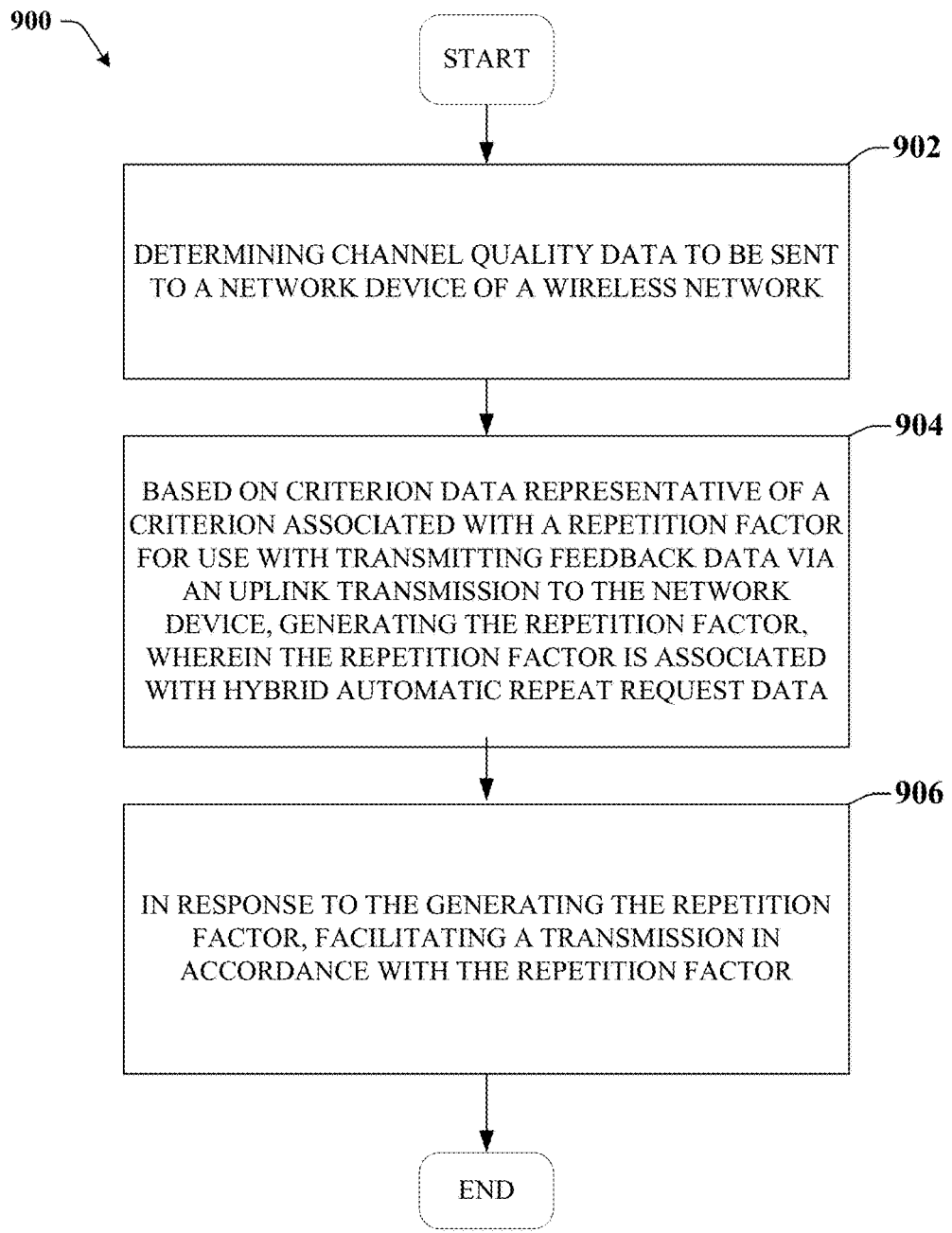
FIG. 9 illustrates an example flow diagram for a mobile device determining a repetition factor according to one or more embodiments.

Referring now to FIG. 9, illustrated is an example flow diagram 900 for a mobile device determining a repetition factor. At element 902, a machine-readable storage medium can facilitate determining channel quality data to be sent (e.g., from the UE 102) to a network device (e.g., the network node 106) of a wireless network. Based on criterion data representative of a criterion associated with a repetition factor for use with transmitting feedback data via an uplink transmission to the network device, the machine-readable storage medium can facilitate generating (e.g., via the UE 102) the repetition factor, wherein the repetition factor is associated with hybrid automatic repeat request data at element 904. At element 906, the machine-readable storage medium can further facilitate a transmission (e.g., via the UE 102) in accordance with the repetition factor in response to the generating the repetition factor.

Figure 10:
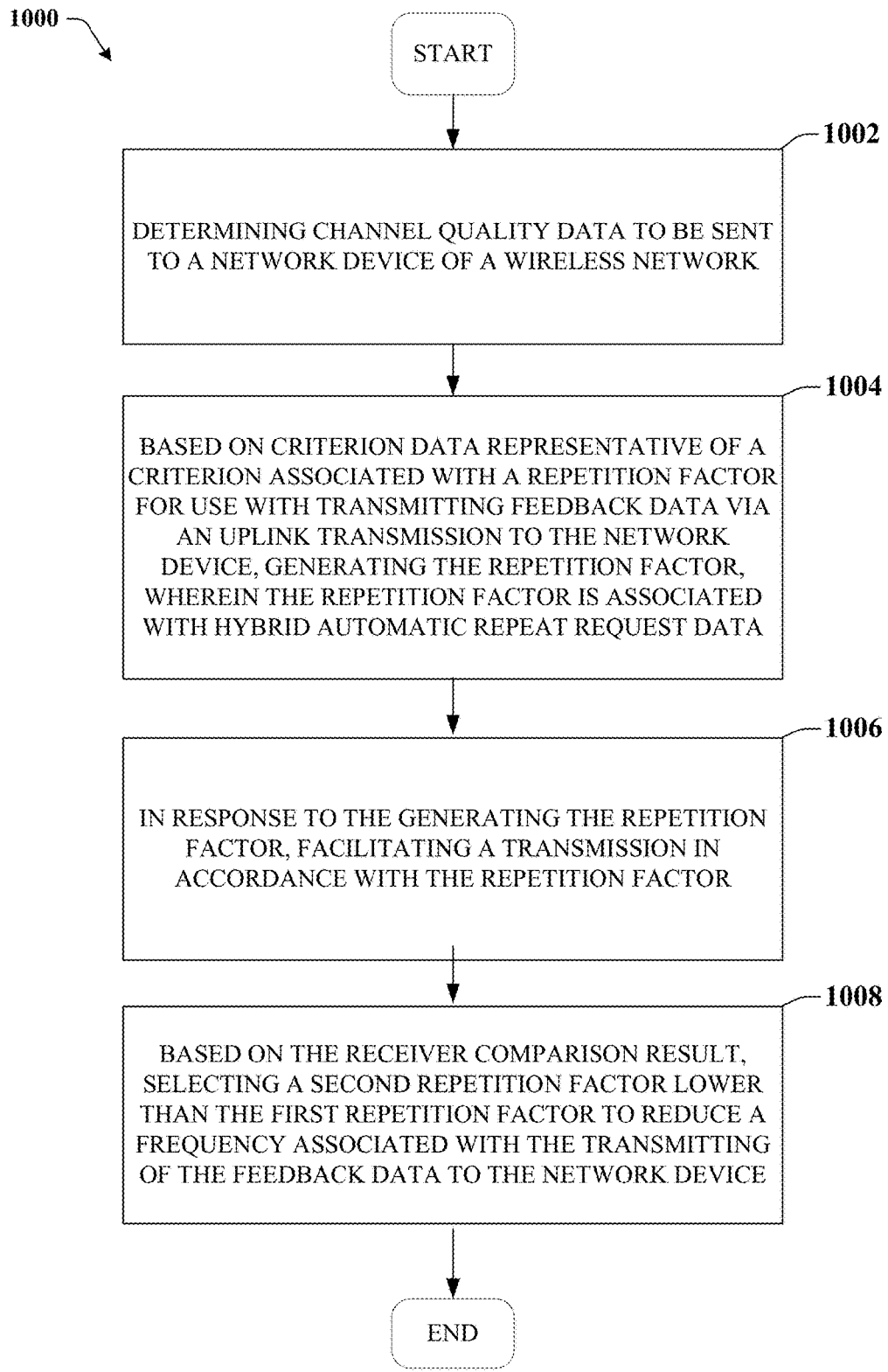
FIG. 10 illustrates an example flow diagram for a mobile device determining a repetition factor according to one or more embodiments.

Referring now to FIG. 10, illustrated is an example flow diagram 1000 for a mobile device determining a repetition factor. At element 1002, a machine-readable storage medium can facilitate determining channel quality data to be sent (e.g., from the UE 102) to a network device (e.g., the network node 106) of a wireless network. Based on criterion data representative of a criterion associated with a repetition factor for use with transmitting feedback data (e.g., from the UE 102) via an uplink transmission to the network device (e.g., the network node 106), the machine-readable storage medium can facilitate generating the repetition factor, wherein the repetition factor is associated with hybrid automatic repeat request data at element 1004. At element 1006, the machine-readable storage medium can further facilitate a transmission (e.g., from the UE 102) in accordance with the repetition factor in response to the generating the repetition factor. At element 1008, the machine-readable storage medium can further facilitate selecting a second repetition factor lower than the first repetition factor to reduce a frequency associated with the transmitting of the feedback data to the network device (e.g., the network node 106) based on the receiver comparison result.

Figure 11:
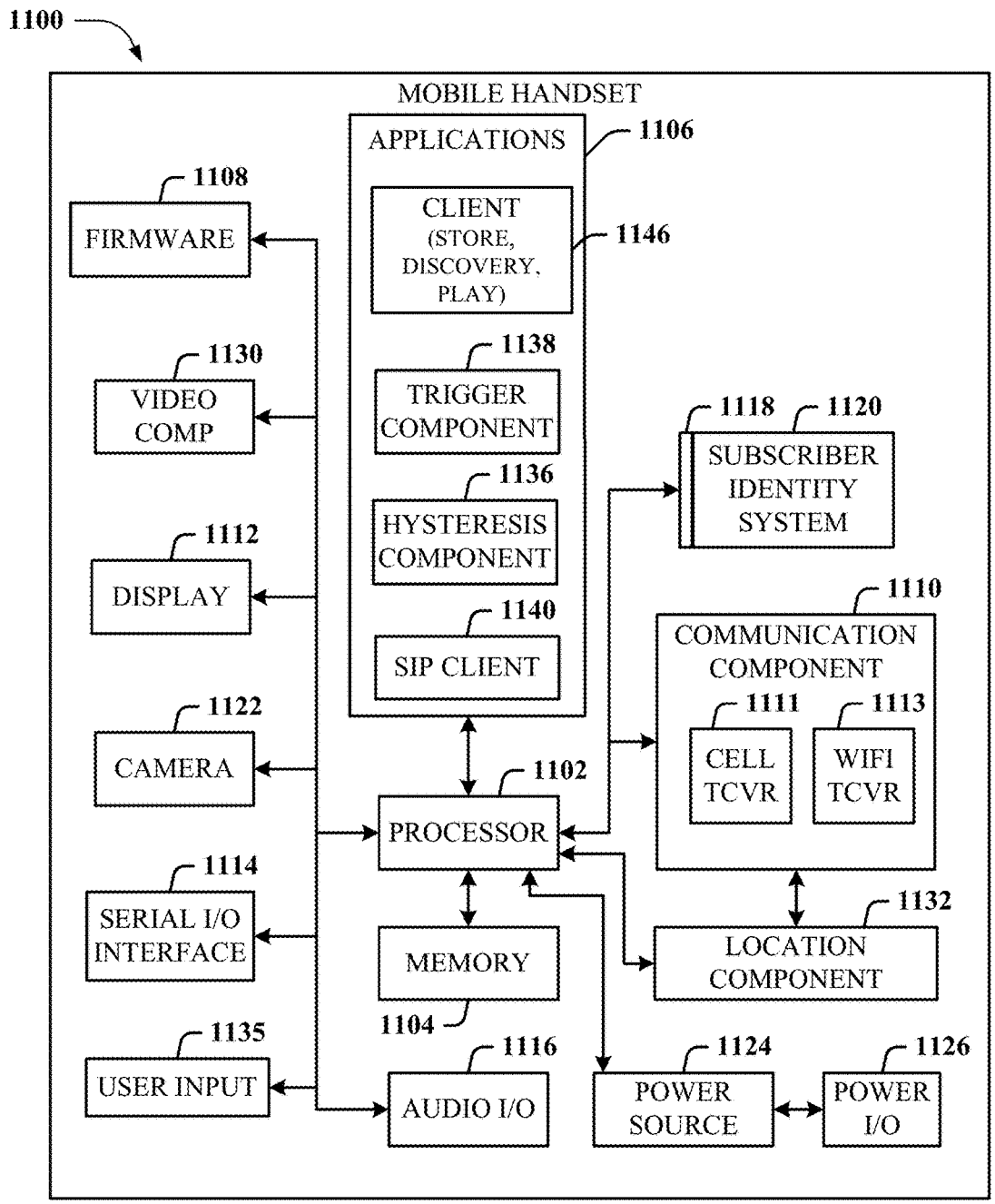
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
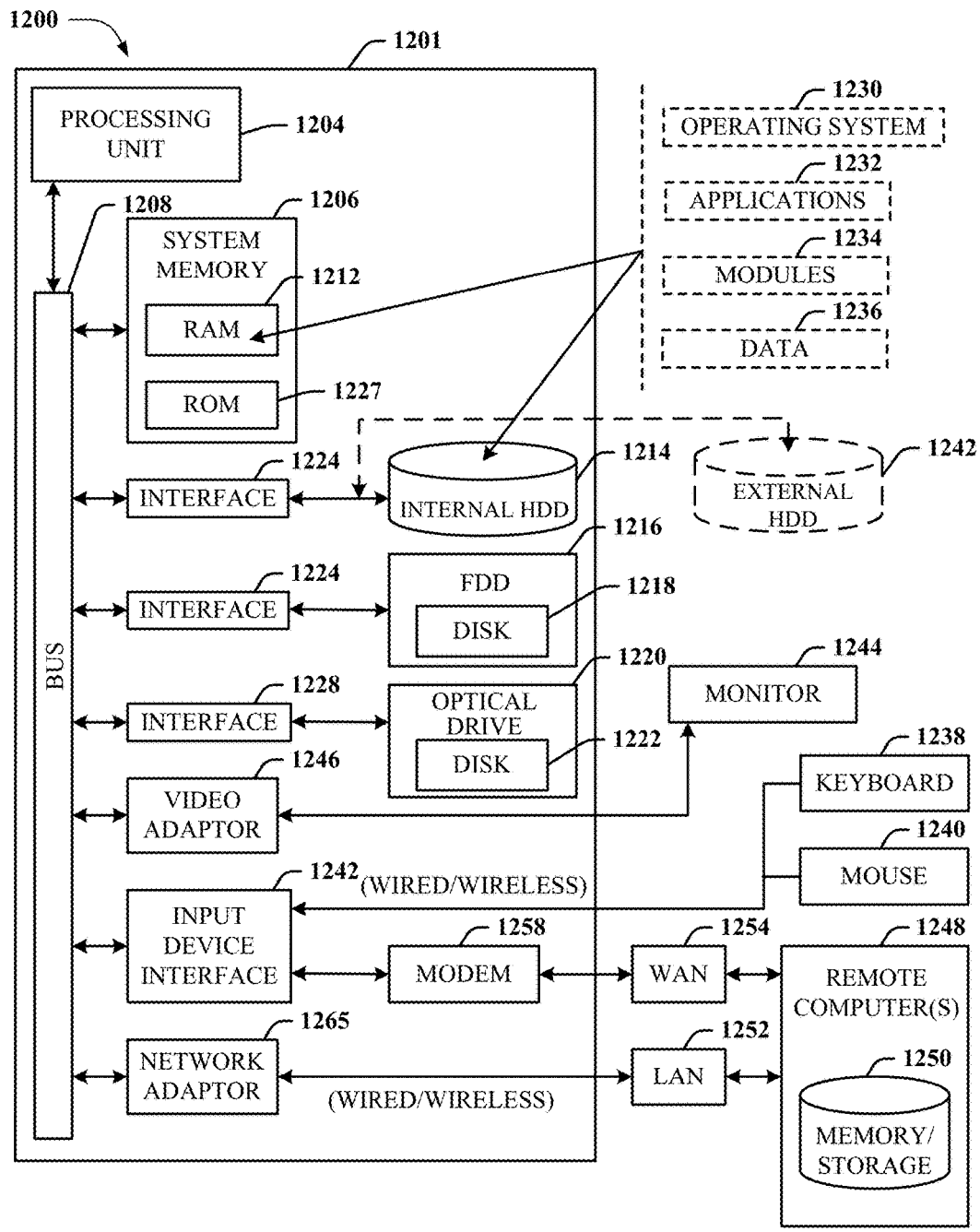
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In general it is common practice to configure the repetition factors for UE feedback information (e.g. HARQ ACK/NAK and for CQI) to a certain fixed value. For example the network configures one of these values from the pre-defined set of values and signals to the UE. However, configuring a fixed value to all the UEs is not always beneficial. In some scenarios or situations the fixed repetition factor can lead to performance degradation and can also waste uplink resources due to unnecessary repetition. Thus, the fixed repetition factor may not always enable the network to fully exploit the benefit of adaptive modulation and coding.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A mobile device, comprising:
a processor; and
a memory that stores executable instructions that, when executed by the processor, facilitate performance of operations, comprising:
determining, by the mobile device, channel quality data to be sent to a first network device of a wireless network;
based on repetition data associated with a repetition factor applicable to a repetition of sending the channel quality data to the first network device, determining, by the mobile device, the repetition factor for transmission of feedback data associated with an uplink transmission to the first network device via a channel, wherein the repetition factor transmitted to the first network device is associated with hybrid automatic repeat request data different from the channel quality data;
in response to the determining the repetition factor, transmitting, by the mobile device, the repetition factor to the first network device; and
transmitting, by the mobile device, the repetition factor to a second network device, of the wireless network, that is not the first network device.

2. The mobile device of claim 1, wherein the channel is an uplink channel associated with uplink transmissions.

3. The mobile device of claim 1, wherein the channel quality data is representative of a quality of the channel between the mobile device and the first network device.

4. The mobile device of claim 1, wherein the repetition factor is based on a processing capability of the second network device.

5. The mobile device of claim 1, wherein the transmitting the repetition factor to the first network device reduces a transmission of negative acknowledgment data, from a first value to a second value lower than the first value, to inform the first network device of a change in state of the mobile device.

6. The mobile device of claim 1, wherein the repetition factor is based on a location of the mobile device in relation to the first network device.

7. The mobile device of claim 1, wherein the repetition factor is based on a number of mobile devices communicating with the first network device via the channel, and wherein the channel is an uplink channel associated with uplink transmissions.

8. A system, comprising:
a processor; and
a memory that stores executable instructions that, when executed by the processor, facilitate performance of operations, comprising:
configuring a mobile device to transmit uplink feedback data, associated with an uplink feedback of an uplink control channel of a first network device of a wireless network, to a second network device of the wireless network;
based on a criterion associated with a repetition value, determining the repetition value to be used by the mobile device to repeat a transmission of the uplink feedback data to the second network device, wherein the repetition value transmitted to the second network device is associated with hybrid automatic repeat request data different from channel quality data;
in response to the determining the repetition value, transmitting the repetition value to the mobile device to transmit the uplink feedback data in accordance with the repetition value; and
transmitting the repetition factor to the mobile device to facilitate the mobile device transmitting the uplink feedback data, in accordance with the repetition factor, to the second network device.

9. The system of claim 8, wherein the transmitting the repetition value facilitates a reduction in power associated with uplink transmissions via the uplink control channel.

10. The system of claim 8, wherein the transmitting the repetition value facilitates a reduction in a battery power usage by the mobile device.

11. The system of claim 8, wherein the repetition value is a first repetition value, and wherein the configuring comprises configuring the mobile device with a second repetition value lower than the first repetition value based on the mobile device being determined to be at a first location in relation to a second location of the second network device.

12. The system of claim 8, wherein the operations further comprise:
based on an indication that a first location of the mobile device is closer to the first network device than a second location of the mobile device, reducing the repetition value to be used by the mobile device.

13. The system of claim 12, wherein operations further comprise:
in response to the reducing the repetition value, facilitating reducing a frequency of transmissions of the uplink feedback data from the mobile device.

14. The system of claim 8, wherein the operations further comprise:
based on an indication that a first location of the mobile device is farther from the first network device than a second location of the mobile device, increasing the repetition value to be used by the mobile device.

15. A non-transitory machine-readable storage medium, comprising executable instructions that, when executed by a processor of a mobile device, facilitate performance of operations, comprising:
determining channel quality data to be sent to a first network device of a wireless network;
based on criterion data representative of a criterion associated with a repetition factor for use with transmitting feedback data via an uplink transmission to the first network device, generating the repetition factor, wherein the repetition factor is associated with hybrid automatic repeat request data; and
in response to the generating the repetition factor, facilitating a first transmission in accordance with the repetition factor, to the first network device; and
in response to the generating the repetition factor, facilitating a second transmission, in accordance with the repetition factor, to a second network device, of the wireless network, that is not the first network device.

16. The non-transitory machine-readable storage medium of claim 15, wherein the criterion is a first criterion, wherein the first criterion is associated with a location of the mobile device, and wherein a second criterion is associated with a receiver performance of the first network device.

17. The non-transitory machine-readable storage medium of claim 16, wherein the receiver performance is a first receiver performance of a first receiver, and wherein the first receiver performance is compared to a second receiver performance of a second receiver associated with the second network device, yielding a receiver comparison result.

18. The non-transitory machine-readable storage medium of claim 17, wherein the repetition factor is a first repetition factor, and wherein the operations further comprise:
based on the receiver comparison result, selecting a second repetition factor lower than the first repetition factor to reduce a frequency associated with the transmitting of the feedback data to the first network device.

19. The non-transitory machine-readable storage medium of claim 18, wherein a receiver associated with the first network device is configured to reduce an interference caused by transmission signals sent by the mobile device.

20. The non-transitory machine-readable storage medium of claim 17, wherein the second receiver associated with the second network device is an enhanced receiver configurable to cancel interference from transmission signals sent by the mobile device.

* * * * *